Feb. 23, 1943.  R. H. NEISEWANDER  2,312,118
ADJUSTABLE WOODWORKING MACHINE
Filed July 31, 1940  4 Sheets-Sheet 1
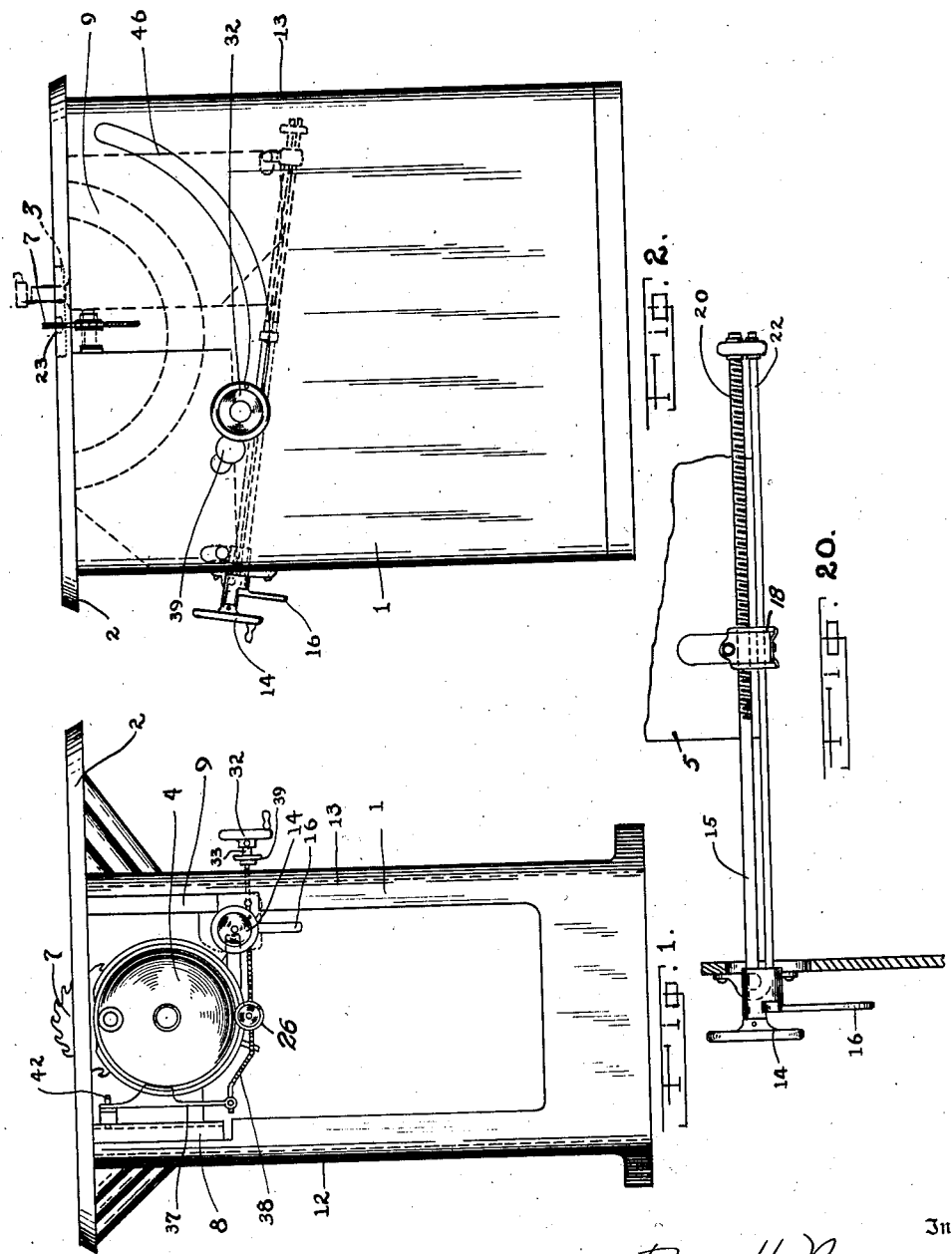
Inventor
Ray H. Neisewander
By
A B McCall
Attorney Feb. 23, 1943.  R. H. NEISEWANDER  2,312,118
ADJUSTABLE WOODWORKING MACHINE
Filed July 31, 1940   4 Sheets-Sheet 2

Inventor
Ray H. Neisewander
By A. B. McCall
Attorney

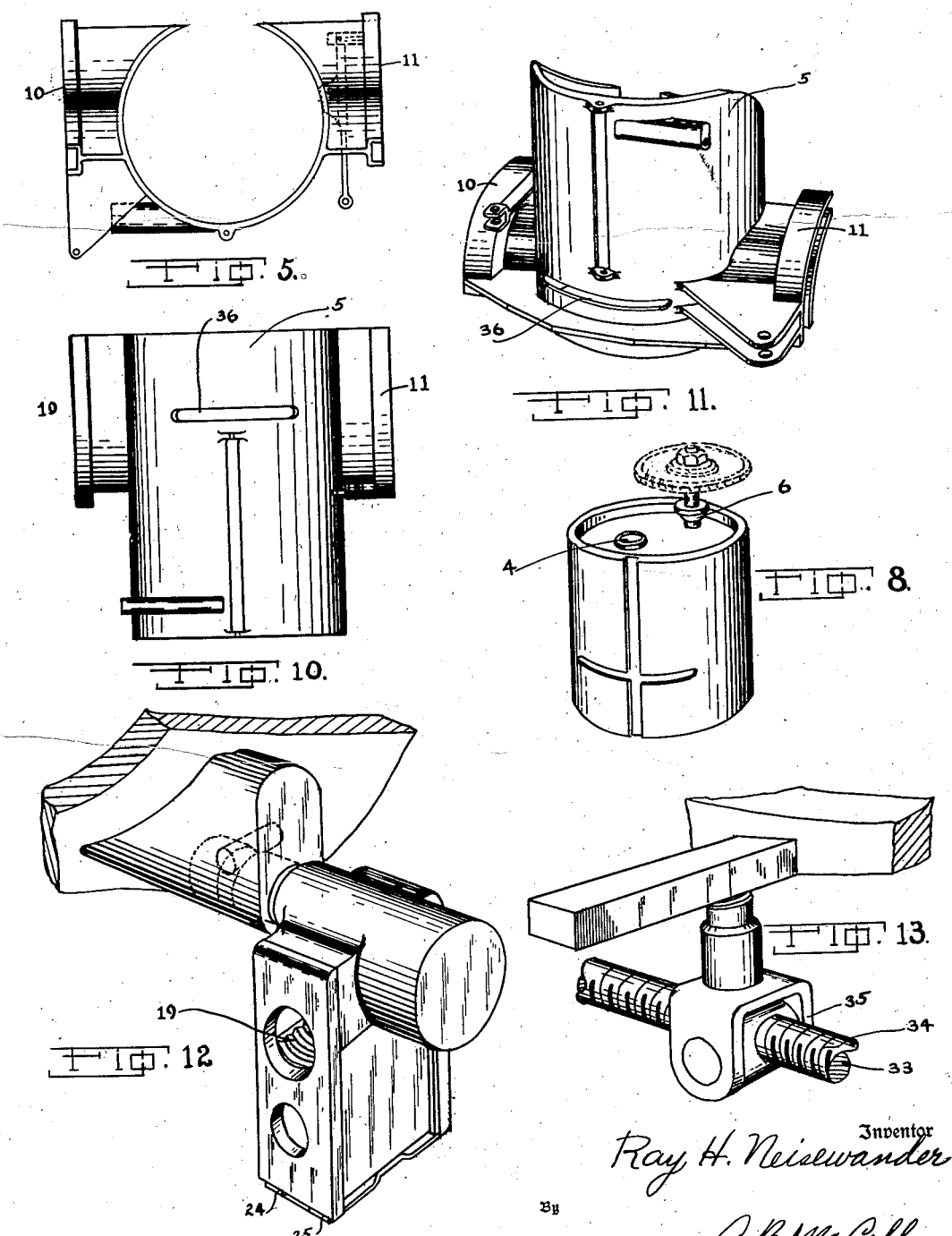

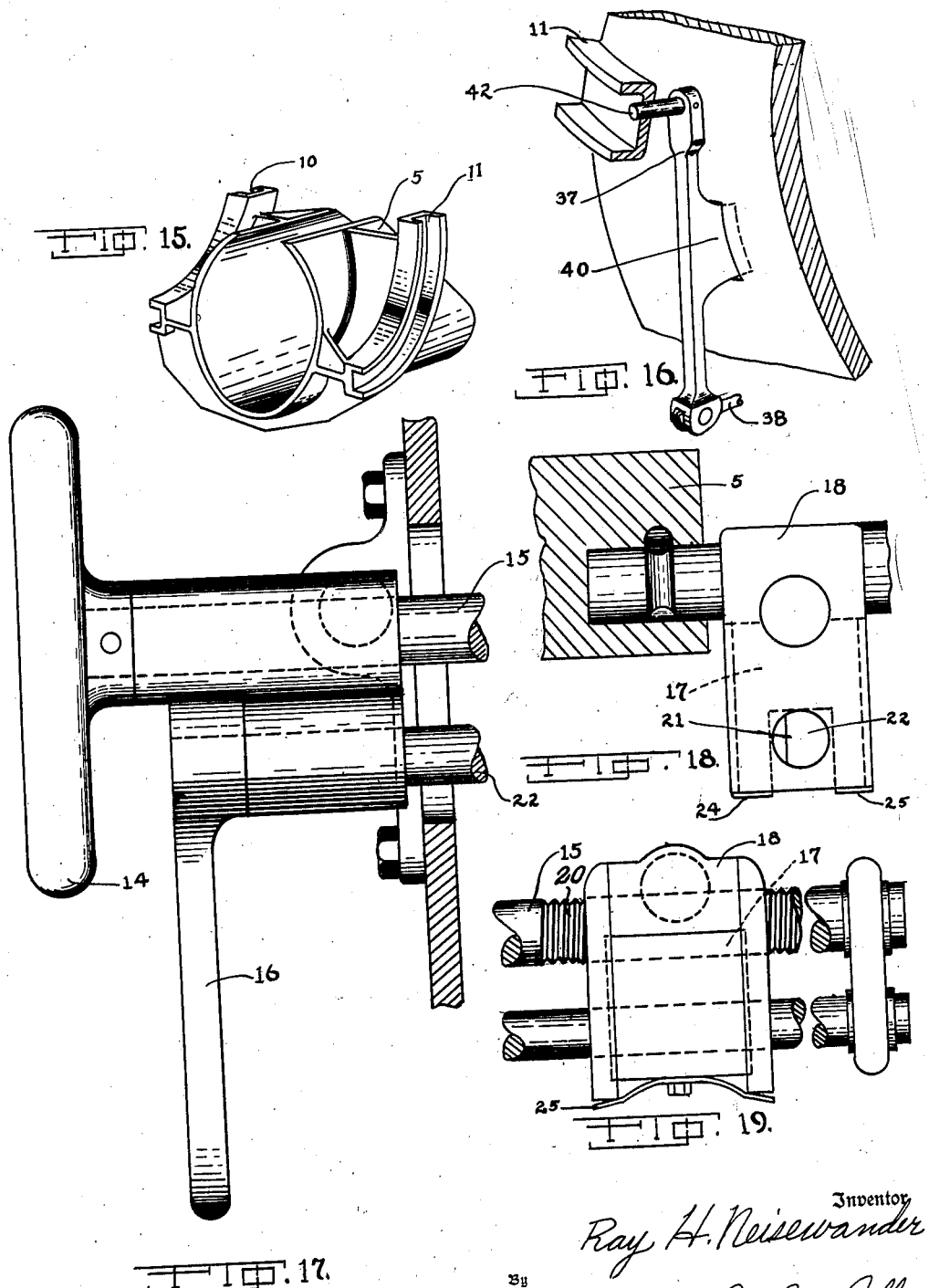

Patented Feb. 23, 1943

2,312,118

UNITED STATES PATENT OFFICE 2,312,118

ADJUSTABLE WOODWORKING MACHINE

Ray H. Neisewander, Springfield, Ill.

Application July 31, 1940, Serial No. 348,992

1 Claim. (Cl. 143—36)

My invention relates to wood working machines and more especially to machines for operating a circular saw, shaper knives and the like; an object being in my device to provide a wood working machine which is operatively adjustable in such positions of adjustment as will make it not only more convenient to work with but in positions of adjustment which will make the machine adaptab to new uses, new purposes and new services which are not commonly found all in one machine.

A further purpose of my wood working machine is to provide in one machine unit, a construction which makes the machine a comparatively compact unit capable of being made and used in a small size for one purpose and in larger sizes for additional purposes, with details of construction in the one machine unit such as will permit variations in the operating position of wood working tools detachably connected therewith so that different wood working operations may be accomplished by the one machine.

A further purpose of my invention is to provide a wood working machine unit wherein a tool supporting spindle having a detachable mounting for circular saws, shaper knives and the like, is operatively supported in a cylindrical drum in a position wherein the axis of the spindle is parallel with but off-set from the axis of the supporting drum therefor; so that variations may be made in the depth of saw cut when a circular saw is running or variations may be made in the running position of shaper knives operated on the spindle.

In my invention it will be noted that the tool supporting spindle may either be on an independent shaft or may be carried on the motor axis of the driving motor therefor with the motor axis off-set from the axis of the supporting cylindrical drum housing the same; or if desired a driving belt connection may be made between the motor and the tool supporting spindle; but in any case provides for an off-set mounting and operation for the tool supporting spindle in its cylindrical drum housing.

A particular purpose of my invention is to provide the above mentioned conveniences in a novel wood-working machine wherein the driving motor actuating the tool supporting spindle may be pivotally as well as slidably adjustable with the tool supporting spindle in a cylindrical drum housing under the working top of a wood working table and together with this convenience, a construction which permits a selective adjustment in the relative operating direction or position of the axis of the drum housing supporting the driving motor and tool supporting spindle adjustably operating therein.

The working table top of my wood working machine has a removable section adjacent the working end of the tool spindle to permit the circular saws to rotate through the table top and permit the spindle to be adjusted in an upright position for the operative rotation of shaper knives to be used thereon.

I attain the objects of my invention in the wood working machine described in this specification as I refer to the drawings which illustrate the same.

Referring to the figures:

Fig. 1 is a front view of the wood working table of my machine.

Fig. 2 is an end view of the same.

Fig. 5 is an end view of the motor and spindle supporting drum.

Fig. 8 is an upright perspective of the same.

Fig. 10 is a bottom view of the drum.

Fig. 11 is a perspective of the drum from below its level.

Fig. 12 is a perspective of the supporting and controlling lug and bracket for adjustments in the motor housing drum.

Fig. 13 is a detail of the hand wheel connection with the motor for making pivotal adjustments thereof.

Fig. 15 is a perspective of the drum from a position above it.

Fig. 16 is a detail showing the fitting relation of the drum and locking lever.

Fig. 17 is a detail of the hand controls for shifting the drum positions.

Fig. 18 is an end view of the supporting bracket for the drum adjusting rods.

Fig. 19 is a side view of the same.

Fig. 20 is a detail of the quick action and vernier control for the adjustments of the motor and spindle supporting drum.

Figure 3:
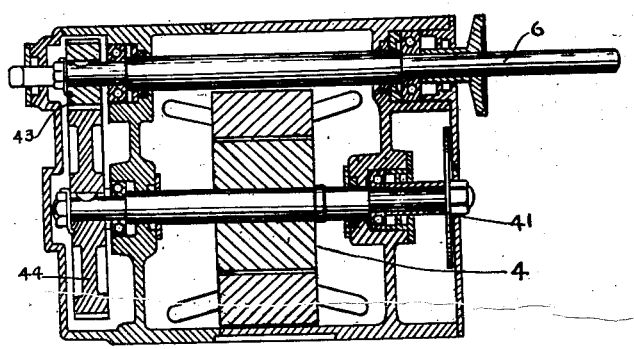
Fig. 3 is a longitudinal half-section of my motor and tool spindle.
Figure 4:
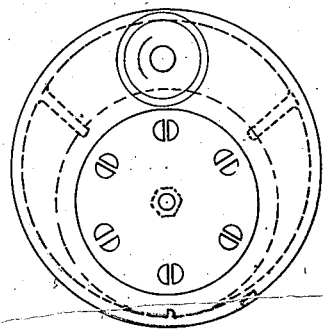
Fig. 4 is an end view of the same.
Figure 7:
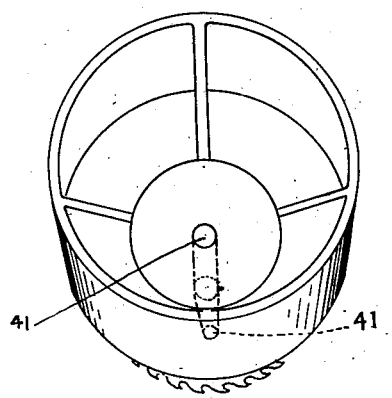
Fig. 7 is an end view showing a construction wherein the tool spindle is on the motor axis.
Figure 6:
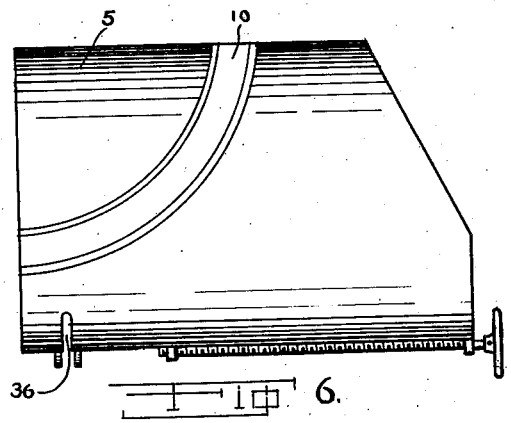
Fig. 6 is a side view of the same.

I shall now point out the salient features of my invention as I describe the novel details of construction thereof, referring to the figures of the drawings for the more comprehensive understanding of the merits of this invention.

It is conceivable that a wood-working machine designed to accomplish more than one purpose without major changes therein may be an advantage over such machines provided for one purpose only for more than one reason; namely economy of manufacture, economy of working space in a shop and economy of working time.

In addition to these advantages which I accomplish with my invention, I find it decidedly more convenient to manipulate the mechanism of my wood working machine and to make the needed adjustments which may arise in its operation.

The novel and compact wood working machine unit of my invention has the advantages of combining in one efficient machine, a circular saw as well as a practical and efficient shaper, requiring only an adjustment in the supporting drum for the tool mounting and motor to achieve the two distinct purposes after a change is made in the tools to be used; while in addition to these features of merit in my invention, I have provided means in its construction whereby a very ready and practical adjustment may be made in the cutting depth of the circular saw when in use.

Referring to the drawings and a more detailed study of my invention, I provide a working table 1 having a fixed table top 2 with a removable plate 3 of this table top to provide a convenient space for the operation of wood working tools on the working table top.

The advantages of my wood working machine will become obvious as details of its construction are pointed out.

For instance, a driving motor 4 is both slidably and pivotally supported within cylindrical drum 5 for its housing and protection; while a tool supporting spindle 6 integral with motor 4 is off-set with respect to the axis of drum 5 but is actuated in its rotation by motor 4.

Thus, when spindle 6 is operatively supported circular saw 7 rotating through slot 23 in the table top 2 then the depth of saw cut made by this circular saw 7 may be selectively varied by an adjustment in the pivotal position of motor 4 and spindle 6 within the housing 5.

In addition to this merited feature of an optional variation in the depth of saw cut made possible with my machine, I have operatively mounted this cylindrical supporting drum 5 upon a pair of arcuate sliding brackets 8 and 9 engaged respectively by supporting channel arms 10 and 11 of drum 5.

These arcuate sliding brackets 8 and 9 are made integral with the side plates 12 and 13 of table 1.

Thus, when it may be desired to make an angular saw cut with the circular saw 7 then drum 5 may be tilted in its support on brackets 8 and 9, enough to set circular saw 7 at the desired tilting angle where it comes through table top 2.

This tilting adjustment wich may be made at will in the position of drum 5 may be easily made by rotating hand wheel 14 turning threaded rod 15. This may be done by leaving hand lever 16 in its normally lower position permitting lug 17 of bracket 18 to threadably engage the lug threads 19 into threads 20 of threaded rod 15. See Figures 18 to 20. This hand wheel 14 is preferably used only when a small adjustment may be needed.

Bracket 18 is pivotally secured to the circular drum 5 as a means of effecting these adjustments in the tilted position of drum 5.

However, in case it may be desired to make a major adjustment in the tilted position of the motor supporting drum 5 then hand lever 16 may be pivotally turned to permit the flat side 21 of slide rod 22 to register below lug 17 permitting this lug to drop down out of tilted contact with threads 20 making it thus possible to slidably shove drum 5 around on brackets 8 and 9 until this drum registers in a position where its axis is in a vertical plane with the spindle 6 extending up through table top 2.

In this upright position spindle 6 is prepared for a table mounting of shaper blades of selected design to be thus used in the manner and for the purpose for which shaper blades are commonly used.

In a study of the drawings, it will be noted that arcuate brackets 8 and 9 have their central axis running lengthwise through slot 23 so that a saw 7 may be removed for this adjustment in the spindle position.

It will be noted that lug 17 adjustably supported in bracket 18 pivoted on drum 5 for the tilting adjustment of the drum, has a pair of spring member 24 and 25 for pulling threads 19 of lug 17 down away from meshing engagement with threads 20 of rod 15; while lug 17 may be thrown into threadable engagement with rod 15 merely by pivotally turning handle lever 16 bringing the round side of rod 22 up into contact with lug 17 forcing the lug threads 19 up into meshing engagement with threads 20 of threaded rod 15. Thus, a complete adjustment may be easily and quickly made in the tilting direction and position of drum 5 in its slidable support upon arcuate brackets 8 and 9.

Figure 9:
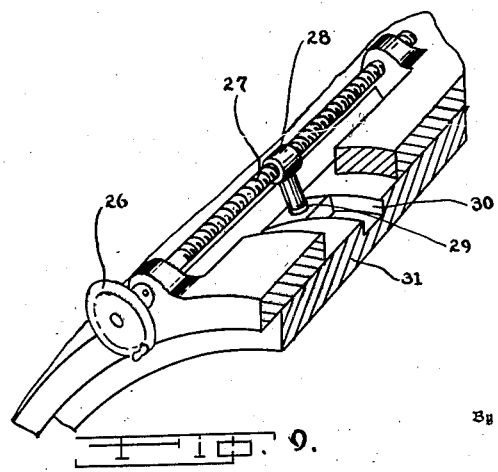
Fig. 9 is a detailed perspective of the hand wheel and threaded shaft for adjusting the motor lengthwise in the drum.

It will be noted that when a slidable lengthwise adjustment is made in the position of motor 4, this adjustment may be made by turning hand wheel 26 controlling threaded adjustment bar 27 which threadably engages bracket 28 secured to a sliding bar 29 which is slidably movable in a groove 30 of the motor casing 31. See Figure 9.

When it is desired to pivotally move motor 4 in drum 5, then a hand wheel 32 controlling threaded rod 33 (Fig. 13) may be rotated to permit threads 34 of rod 33 to move bracket 35 secured to motor 4 so that bracket 35 will move in arcuate slot 36 (Figs. 10 and 11) of drum 5 to the selected position desired of this bracket 35 and making a selected adjustment in the pivotal swing of spindle 6 and varying the depth of saw cut to be made by saw 7 operating through table top 2.

Figure 14:
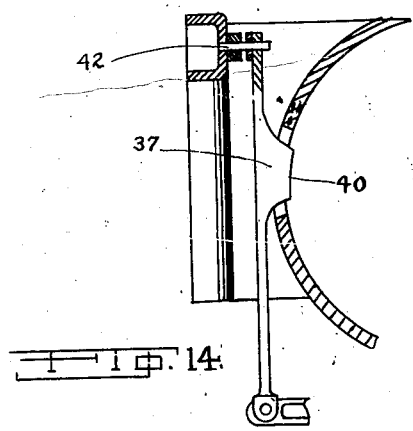
Fig. 14 is a detail of the locking lever and pin for holding the drum and motor where they are adjusted.

After desired selective adjustments are made in the pivotal or sliding position of motor 4 and spindle 6 in drum 5, a clamping bracket 37 (Figures 14 and 16) pivoted at one end and controlled from its free end by a threaded adjustment rod 38 actuated by a hand wheel or lever 39, is provided for holding or clamping motor 4 into its selected positions of adjustment in drum 5 whether its adjustments are pivotal or slidably made lengthwise in drum 5.

The pressure of central portion 40 of clamping bracket 37 against motor 4 locks motor 4 from rotating or sliding lengthwise in drum 5 resulting in the pressure of motor 4 against drum 5 pressing drum 5 rigidly against arcuate bracket 9; while pin 42 effectively serves as a rigid fulcrum for clamping lever 37.

Within the scope of my invention, it is to be noted that motor 4 may be mounted in drum 5 so that the motor axis will be off-set from the center axis of drum 5 parallel to it and with a tool supporting spindle 6 operatively carried in longitudinal alignment with and at the end of spindle 41 of motor 4.

In the event that it may be desirable to connect spindle 6 with motor 4 by a driving belt 45 (not shown), it is obvious that such a driving control may be substituted for the driving gear 43 and 44 shown in Fig. 3 as the driving means of connection by the motor 4 and spindle 6.

In a study of the construction of drum 5, it will be noted that this drum may be held in any desired position of its tilting adjustment by bracket 18 and pin 42. Rod 33 extends through arcuate slot 46 to pivotally adjust motor 4.

It will be further noted that the top surface of drum 5 may be made to register closer to the top surface of table top 2 if a portion of the top part of the drum body be removed to let the drum register up closer to table top 2 or if a portion of the bottom surface of table top 2 were taken off, this drum could likewise be operatively registered up more closely to the bottom surface thereof, thus to draw spindle 6 up as high as it would be practical to use it.

In a careful analysis of the construction of my wood working machine, it will be obvious that certain minor details of its working parts may be changed in their form and connection without departing from the spirit of my invention but having thus described the salient and novel features of merit of my invention, what I claim is:

A wood working machine comprising a wood-working table, a spindle for the detachable support of wood-working tools beneath the top of said table and an electric motor controllably connected with said spindle, said table top shaped to define an opening through which circular saws may rotate with said spindle and through which said spindle may uprightly extend for the detachable support of wood-working shapers and the like, a cylindrical drum pivotally supported beneath said table top and having the center of its pivotal adjustment registering in said opening in the table top, said motor provided with screw means for its longitudinal adjustment within said drum and means connected with said drum and with said motor for selectively and threadably adjusting the pivotal position of the motor within said drum, housing the same, said spindle off-set in its position with respect to the axial center of said drum to provide selectivity in the depth of cut for circular saws mounted thereon, clamp means operatively connected with said drum and gripping said motor housing and holding the motor into selected positions of pivotal and lengthwise adjustment in the drum, a pair of oppositely disposed integral arcuate arms secured to said drum for its support and a pair of corresponding semi-circular brackets fixed on said wood-working table beneath the top thereof for the slidable arcuate support of said drum and the motor and spindle housed therein, a pivoted threaded bar and a parallel smooth bar having one side flattened and each pivotally supported adjacent one end, a lug having threads at one end and shaped at its opposite end to define a yoke, said lug slidably supported on said smooth bar and a hand wheel secured to the pivoted end of said threaded bar; whereby said drum may be selectively adjusted to any working position and its axis from a horizontal to a vertical plane and whereby in making said adjustment about said center of the pivotal support therefor, if desired, the major movement may be made in such an adjustment by direct hand pressure against the drum after releasing said threaded lug from said threaded bar and a finer selective adjustment may be made by rotating the threaded bar when the threaded lug meshes therewith.

RAY H. NEISEWANDER.